(12) United States Patent
Park et al.

(10) Patent No.: US 8,593,281 B2
(45) Date of Patent: Nov. 26, 2013

(54) PASSAGE ALERT SYSTEM AND METHOD USING RFID

(75) Inventors: Dong Joon Park, Gumi-si (KR); Soon Shik Hwang, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 855 days.

(21) Appl. No.: 12/476,535

(22) Filed: Jun. 2, 2009

(65) Prior Publication Data

US 2009/0295593 A1 Dec. 3, 2009

(30) Foreign Application Priority Data

Jun. 3, 2008 (KR) ........................ 10-2008-0051975

(51) Int. Cl.
*G08B 13/14* (2006.01)

(52) U.S. Cl.
USPC ....................................... 340/572.1; 340/326

(58) Field of Classification Search
USPC .................................. 340/572.1, 573.1, 326
See application file for complete search history.

(56) References Cited

U.S. PATENT DOCUMENTS

2004/0090333 A1* 5/2004 Wildman et al. .......... 340/573.1

FOREIGN PATENT DOCUMENTS

KR 10-2008-0012589 A 2/2008

* cited by examiner

*Primary Examiner* — Shirley Lu
(74) *Attorney, Agent, or Firm* — Jefferson IP Law, LLP

(57) ABSTRACT

A passage alert system and method using a Radio Frequency IDentification (RFID) technology are provided. The method and system are capable of alerting when a mobile terminal having an RFID tag passes the entrance at which an RFID reader is installed, whereby the owner is therefore aware of the mobile terminal. In the passage alert method of the present invention, when the first communication terminal passes an entrance at which the second communication terminal is installed, one of the first and second communication terminals resets the passage mode of the first communication terminal with an output of an alert message corresponding to the changed passage mode such that the owner may be aware of the first communication terminal, thereby reducing the possibility of losing the first mobile communication terminal.

2 Claims, 9 Drawing Sheets

PASSAGE ALERT SYSTEM AND METHOD USING RFID

PRIORITY

This application claims the benefit under 35 U.S.C. §119(a) of a Korean patent application filed in the Korean Intellectual Property Office on Jun. 3, 2008 and assigned Serial No. 10-2008-0051975, the entire disclosure of which are hereby incorporated by reference.

BACKGROUND OF THE INVENTION

1. Field of the Invention The present invention relates to a passage alert system and method. More particularly, the present invention relates to a passage alert system and method implemented with a Radio Frequency IDentification (RFID) technology that is capable of alerting when a mobile terminal having an RFID tag passes the entrance at which an RFID reader is installed.

2. Description of the Related Art

Typically, an RFID system is implemented using RFID tags, each tag containing unique information, and an RFID reader for sensing the tags within a predefined range. Without contacting the tags, the RFID reader can simultaneously sense multiple tags and receive the information transmitted by the tags within the range even when the tags are moving. With its simple operation and design, the RFID technology is applied in various fields such as a parking control system, a time measurement system, an entrance control system, an intelligent traffic system, an integrated management system, a livestock identification system, a factory automation system and the like. In a typical RID system, either a tag or a reader may be coupled to a mobile handset for identifying personnel.

Meanwhile, mobile handsets are now integrating more and more supplementary functions such as text messaging, wireless Internet access, a phonebook, an organizer, and navigation functions as well as a basic voice communication function. For this reason, the mobile handset is becoming one of the most important items a person carries. Accordingly, it is more burdensome to lose a mobile handset than ever before.

To avoid losing the mobile handset, a user must frequently verify its presence. However, the mobile handset is likely to be out of the owner's mind until it is needed for use. For users who are commuting between places like their home and workplace or their home and school, it is likely a routine habit to place their mobile handset in their purse or pocket before they transition from one location to another. However, because it is becomes a routine, the user may more easily forget the mobile handset if the user is in a hurry so it can be easily forgotten. Accordingly, there is a need to devise a way to alert a user of the absence of the mobile handset.

SUMMARY OF THE INVENTION

An aspect of the present invention is to address at least the above-mentioned problems and/or disadvantages and to provide at least the advantages described below. Accordingly, an aspect of the present invention is to provide a passage alert system and method that is capable of alerting when a first communication terminal passes an entrance at which a second communication terminal is installed.

In accordance with an aspect of the present invention, a passage alert method for a radio frequency identification system including a first communication terminal and a second communication terminal fixed at a boundary defining a space is provided. The method includes determining, at the second communication terminal, a new passage mode of the first communication terminal in response to tag information transmitted by the first communication terminal, transmitting mode information indicating the new passage mode to the first communication terminal, and updating, at the first communication terminal, an old passage mode with the new passage mode.

In accordance with another aspect of the present invention, a passage alert method for a radio frequency identification system including a first communication terminal and a second communication terminal fixed at a boundary defining a space is provided. The method includes determining, at the second communication terminal storing alert messages corresponding to respective passage modes, a passage mode of the first communication terminal in response to tag information transmitted by the first communication terminal, and outputting an alert message corresponding to the passage mode.

In accordance with yet another aspect of the present invention, a passage alert method for a radio frequency identification system including a mobile terminal and a fixed terminal installed at a boundary defining a space is provided. The method includes determining, at the mobile terminal storing alert messages corresponding to respective passage modes, a passage mode upon receipt of tag information transmitted by the fixed terminal, and outputting an alert message corresponding to the passage mode.

In accordance with still another aspect of the present invention, a passage alert system for alerting a specific object passing a boundary between two places is provided. The system includes a first communication terminal which includes a mobile tag radiating tag information, and a second communication terminal which is fixed at the boundary and includes a fixed reader for reading the tag information and a fixed controller for determining a passage mode of the first communication terminal based on the tag information.

In accordance with another aspect of the present invention, a passage alert system for alerting a specific object passing a boundary between two places is provided. The system includes a first communication terminal which includes a mobile reader for reading tag information and a mobile controller for determining a passage mode based on the tag information read by the mobile reader, and a second communication terminal which is installed at the boundary and has a fixed tag radiating the tag information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
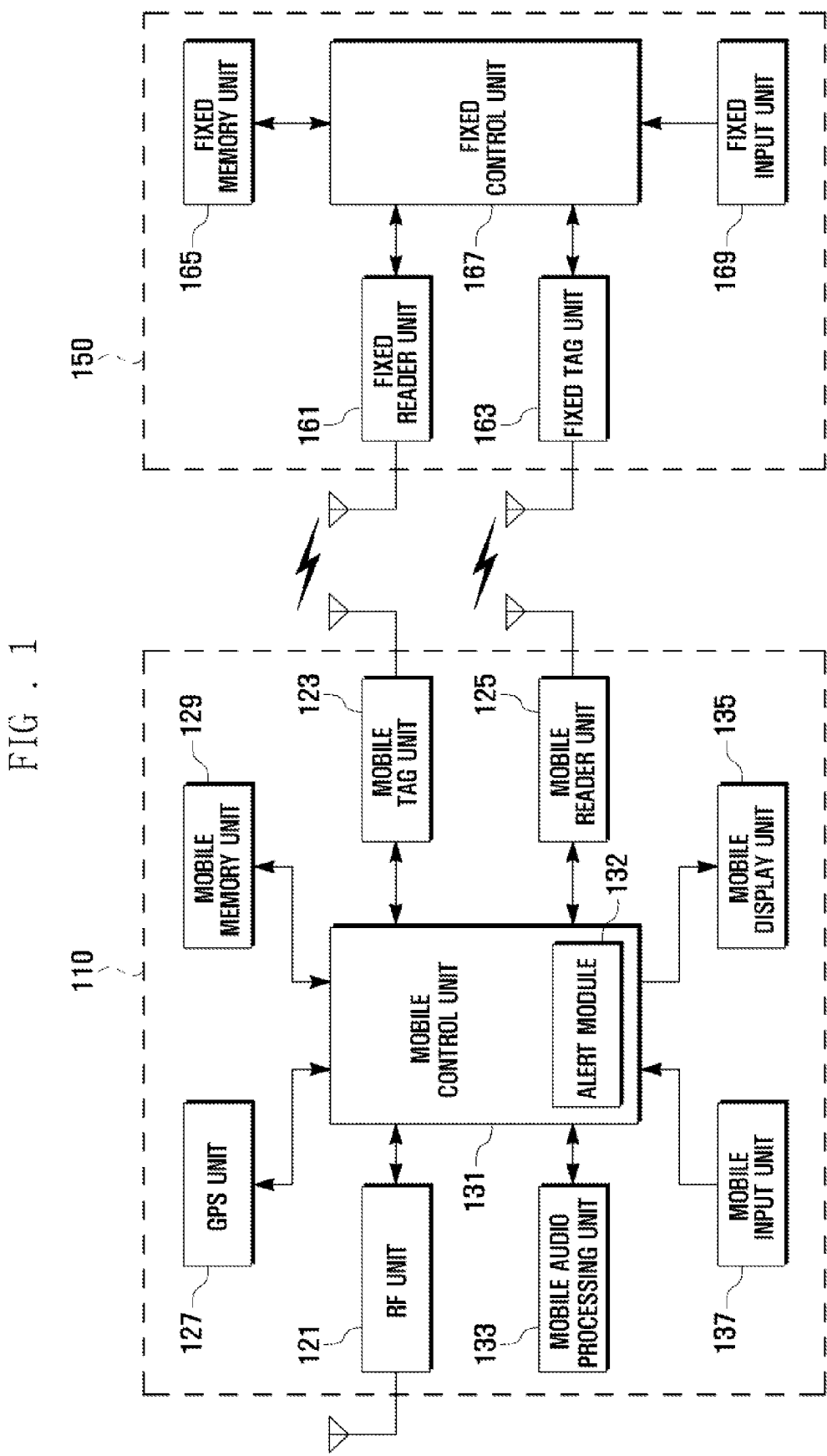
FIG. 1 is a block diagram illustrating a passage alert system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "first communication terminal" denotes a mobile terminal which its owner carries. The owner carrying the first communication terminal routinely passes entrances of sites such as home, workplace, school and the like. The term "first communication terminal" is interchangeably used with the term "mobile terminal." The term "second communication terminal" denotes a fixed terminal which is installed at entrances of the sites. The entrances may include the inside/outside boundaries of the sites as well as interior locations such as a doorway from one room to another. The term "second communication terminal" is interchangeably used with the term "fixed terminal." Each of the first and second communication terminals is provided with either a tag or a reader. The term "tag information" denotes information transmitted by the tag. The tag information may include unique data such as an identity code. The tag information also may include time data indicating the transmission time of the tag information.

The term "passage mode" denotes a location status of the first communication terminal. Generally speaking, there are two passage modes for indicating that a first communication terminal is either within or outside of a given location. For example, the passage modes may include an indoor mode and an outdoor mode. In that case, the term "indoor mode" denotes a status in which the first communication terminal is located inside a site. The term "outdoor mode" denotes a status in which the first communication terminal is located outside a site. The term "mode information" denotes a kind of tag information indicating the passage mode of the first communication terminal. The term "alert message" denotes information for providing the owner with the current passage mode of the first communication terminal. The alert data may include an audible sound and a visual indication. The term "transmission data" denotes the data transmitted by the first communication terminal for informing of the current passage mode. The term "identity information" denotes the unique information allocated to the first communication terminal for identifying the passage of the first communication terminal. The identity information may be previously registered in the form of a phonebook and the like. For example, the identity information may be a phone number or an email address. The term "location check time" denotes the time point when the location of the first communication terminal is updated for determining the passage mode. The location check time may be a fixed time or determined periodically from the time point when the current passage mode is checked.

FIG. 1 is a block diagram illustrating a passage alert system according to an exemplary embodiment of the present invention. In this exemplary embodiment, it is assumed that the first communication terminal is a mobile terminal and the second communication terminal is a fixed terminal.

Referring to FIG. 1, the passage alert system includes a first communication terminal 110 and a second communication terminal 150. The first and second communication terminals 110 and 150 communicate with each other using a radio frequency identification technology.

The first communication terminal 110 includes a Radio Frequency (RF) unit 121, a mobile tag unit 123, a mobile reader unit 125, a Global Positioning System (GPS) unit 127, a mobile memory unit 129, a mobile control unit 131, a mobile audio processing unit 133, a mobile display unit 135, and a mobile input unit 137.

The RF unit 121 is responsible for the cellular communication function of the first communication terminal 110. The RF unit 121 includes an RF transmitter for up converting and amplifying a transmission signal frequency and an RF receiver for low noise amplifying and down-converting a received signal frequency.

The mobile tag unit 123, which contains unique tag information of the first communication terminal 110, transmits the tag information. The mobile tag unit 123 may be configured to radiate the tag information periodically or in response to a request.

The mobile reader unit 125 receives the mode information transmitted by the second communication terminal 150. The mobile reader unit 125 may be configured to request the mode information periodically. The mobile reader unit 125 receives the mode information within its detection range.

The GPS unit 127 receives GPS data from a GPS satellite (not shown) or a location determination server (not shown). The GPS data may include ephemeris, almanac, GPS time and the like.

The mobile memory unit 129 may include program and data memories. The program memory stores application programs for executing operations of the first communication terminal 110. In an exemplary embodiment, the program memory stores programs for configuring the passage mode of the first communication terminal 110. The data memory stores the application data generated while running the application programs. In an exemplary embodiment of the present invention, the mobile memory unit 129 stores transmission data per passage mode. The mobile memory unit 129 stores at least one piece of identity information corresponding to the transmission data.

The mobile control unit 131 controls operations of the first communication terminal 110. The mobile control unit 131 includes a data processing unit that includes of a transmitter for encoding and modulating the transmission signal and a receiver for demodulating and decoding the received signal. The data processing unit may include of a modem and a codec. The codec is provided with a data codec for processing packet data and an audio codec for processing audio signals including voice. In an exemplary embodiment of the present invention, when the mode information is received, the mobile control unit 131 configures the passage mode of the first communication terminal 110 based on the mode information. The mobile control unit 131 includes an alert module 132 which outputs an alert message indicating the passage mode of the first communication terminal 110 under the control of the mobile control unit 131. The mobile control unit 131 also may determine the current position of the first communication terminal 110 based on the GPS data.

The mobile audio processing unit 133 processes the inbound audio signal output by the audio codec of the data processing unit and outputs the audio signal in the form of an audio sound wave through a speaker (SPK) and delivers the outbound audio signal input through a microphone (MIC) to the audio codec of the data processing unit. In an exemplary embodiment of the present invention, the audio processing unit 133 outputs an alert message under the control of the alert module 132.

The mobile display unit 135 displays user data output by the mobile control unit 131. The mobile display unit 135 may be implemented with a Liquid Crystal Display (LCD). In this case, the mobile display unit 135 includes an LCD controller, a memory for buffering video data, and LCD display devices. When using an LCD supporting a touchscreen function, the mobile display unit 135 may be configured to work as a part of the mobile input unit 137. In an exemplary embodiment of the present invention, the mobile display unit 135 displays the alert message under the control of the alert module 132.

The mobile input unit 137 is provided with a plurality of alphanumeric keys for receiving alphanumeric data and function keys for configuring and executing various functions of the first communication terminal 110.

The second communication terminal 150 includes a fixed reader unit 161, a fixed tag unit 163, a fixed memory unit 165, a fixed control unit 167, and a fixed input unit 169.

The fixed reader unit 161 receives the tag information transmitted by the first communication terminal 110. The fixed reader unit 161 may be configured to request the tag information. The fixed reader unit 161 receives the tag information within its detection range.

The fixed tag unit 163 transmits the mode information of the second communication terminal 150. The fixed tag unit 163 may transmit the mode information in response to a request from the first communication terminal 110.

The fixed memory unit 165 may include of program and data memories. The program memory stores application programs for executing operations of the second communication terminal 150. In an exemplary embodiment of the present invention, the program memory stores programs for determining the passage mode of the first communication unit 110. The data memory stores the application data generated while running the application programs. In an exemplary embodiment of the present invention, the fixed memory unit 165 stores the passage mode per preregistered tag information.

The fixed control unit 167 controls operations of the second communication terminal 150. The fixed control unit 167 includes a data processing unit having a transmitter for encoding and modulating the transmission signal and a receiver for demodulating and decoding the received signal. The data processing unit may include of a modem and a codec. The codec is provided with a data codec for processing packet data and an audio codec for processing audio signals including voice.

In an exemplary embodiment of the present invention, the fixed control unit 167 determines the passage mode based on the tag information and transmits the mode information indicating the passage mode to the first communication terminal 110. The fixed input unit 169 is provided with a plurality of alphanumeric keys for receiving alphanumeric data and function keys for configuring and executing various functions of the second communication terminal 150.

Figure 2:
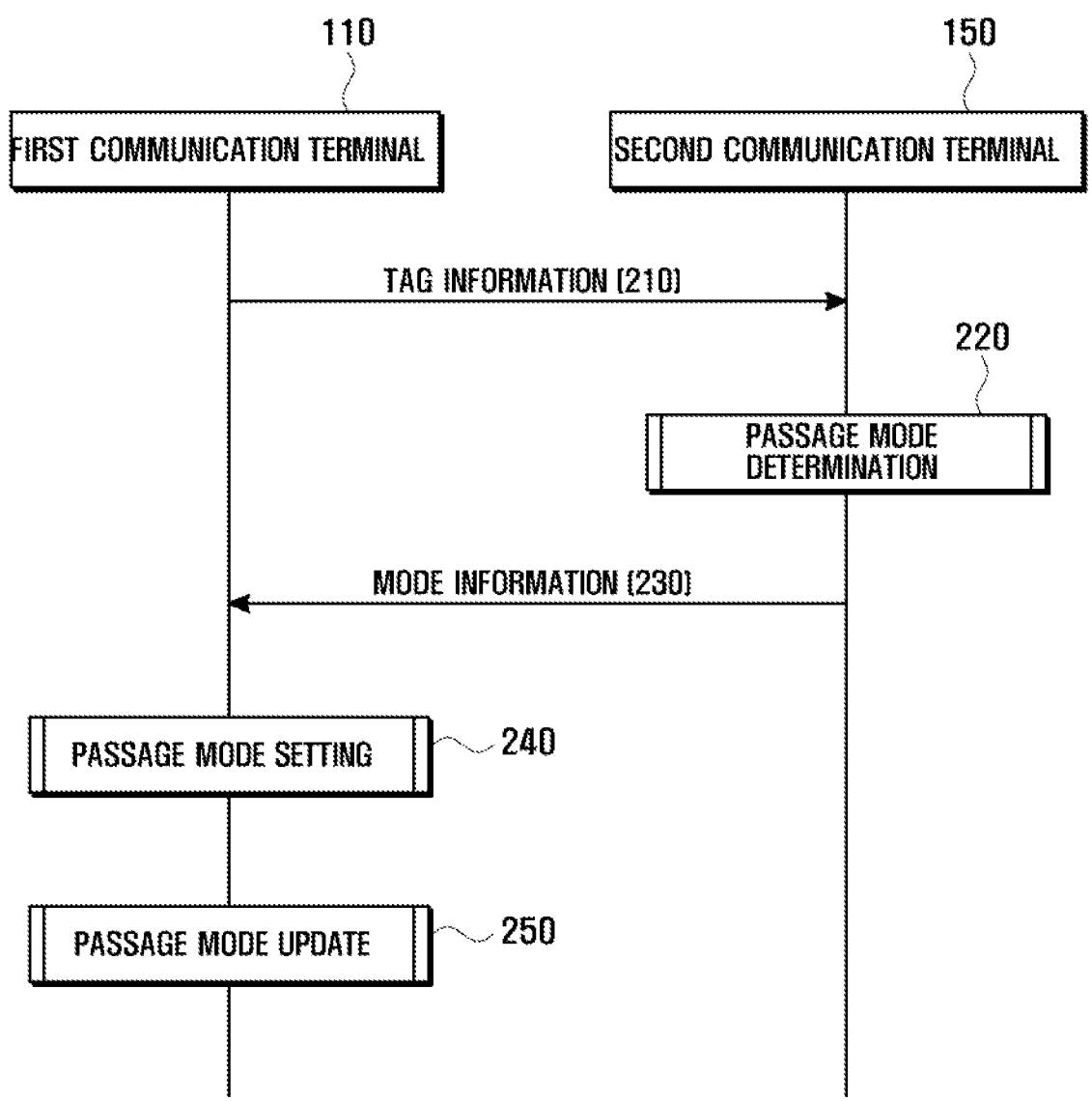
FIG. 2 is a signaling diagram illustrating a passage alert method according to an exemplary embodiment of the present invention.

FIG. 2 is a signaling diagram illustrating a passage alert method according to an exemplary embodiment of the present invention.

Referring to FIG. 2, the first communication terminal 110 first transmits its tag information to the second communication terminal 150 in step 210. Upon receipt of the tag information, the second communication terminal 150 updates the passage mode of the first communication terminal 110 in step 220. In more detail, the second communication terminal 150 determines the passage mode of the first communication terminal 110 based on the tag information.

Figure 3:
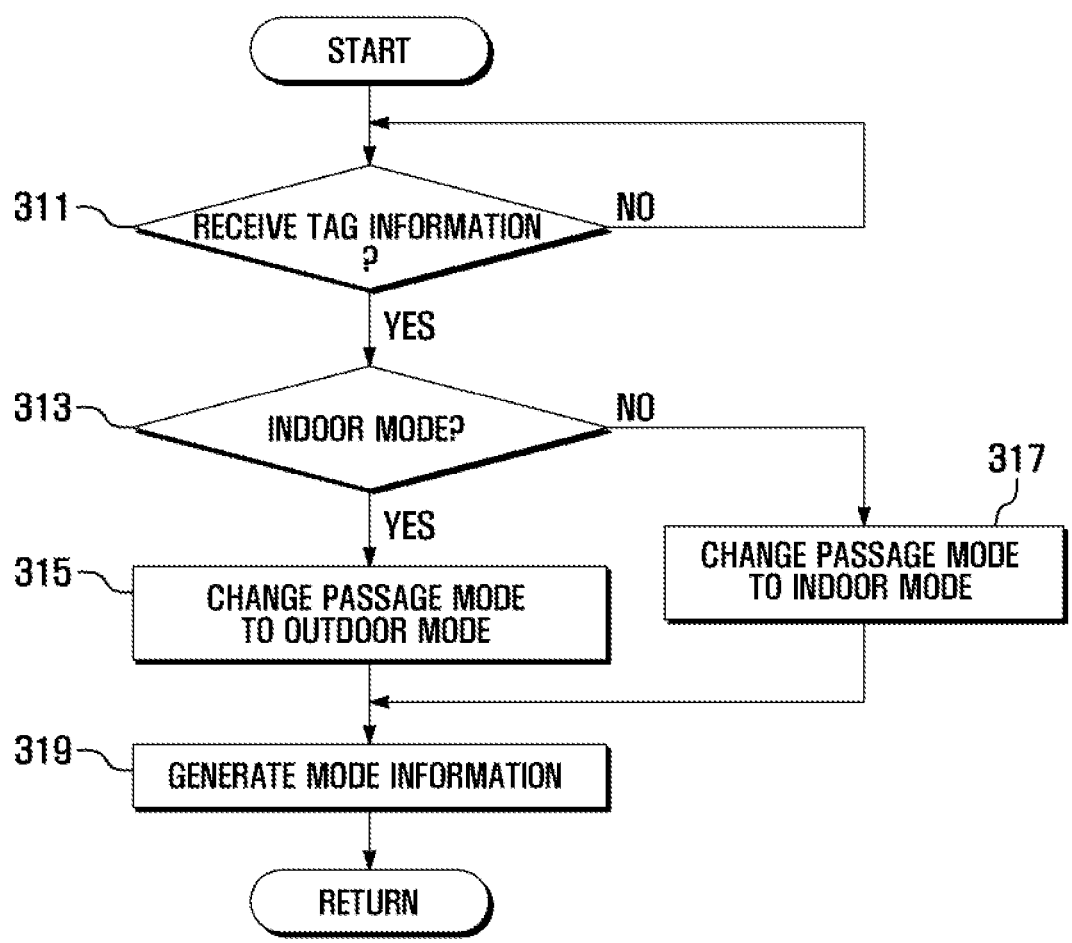
FIG. 3 is a flowchart illustrating a passage mode determination process according to an exemplary embodiment of the present invention.

FIG. 3 is a flowchart illustrating a passage mode determination process according to an exemplary embodiment of the present invention.

Referring to FIG. 3, if the second communication terminal 150 receives the tag information, the fixed control unit 167 of the second communication terminal 150 detects the tag information of the first communication terminal 110 in step 311 and determines the current passage mode of the first communication terminal 110 based on the identity code contained in the tag information in step 313. If the current passage mode of the first communication terminal 110 is the indoor mode, the fixed control unit 167 changes the passage mode to the outdoor mode in step 315. In contrast, if the current passage mode of the first communication terminal 110 is not the indoor mode, the fixed control unit 167 changes the passage mode to the indoor mode in step 317. The passage mode of the first communication terminal 110 may be stored with the identity code of the tag information within the fixed memory unit 165 in the form of Table 1.

TABLE 1

| Identity Code | User | Passage mode | |
|---|---|---|---|
| | | Indoor mode | Outdoor mode |
| 0x000010 | Tony | ◉ | |
| 0x000011 | Allen | | ◉ |
| 0x000012 | Sam | | ◉ |
| 0x000013 | Jane | ◉ | |
| — | — | — | — |

TABLE 1-continued

| | | Passage mode | |
| Identity Code | User | Indoor mode | Outdoor mode |
| --- | --- | --- | --- |
| — | — | — | — |
| — | — | — | — |

For example, if the tag information received from the first communication terminal contains the identity code "0x000010," the fixed control unit 167 uses the table to look up the identity code "0x000010" and determines that Tony's mobile terminal is in the indoor mode. In this case, the fixed control unit 167 changes the passage mode of the Tony's mobile terminal, i.e. the first communication terminal 110, to the outdoor mode.

Next, the fixed control unit 167 generates the mode information for indicating the updated passage mode in step 319. Although not shown, the fixed control unit 167 may further determines whether the identity code, i.e. the first communication terminal, set with the indoor mode exists. In this case, if no first communication terminal set to the indoor mode exists, the fixed control unit 167 inserts a "no-indoor terminal indicator" indicating the no more first communication terminal set to the indoor mode exists.

Returning to FIG. 2, after updating the passage mode of the first communication terminal 110 in the above manner, the second communication terminal 150 transmits the mode information to the first communication terminal 110 in step 230. Upon receipt of the mode information, the first communication terminal 110 resets its passage mode based on the mode information received from the second communication terminal 150 in step 240.

Figure 4:
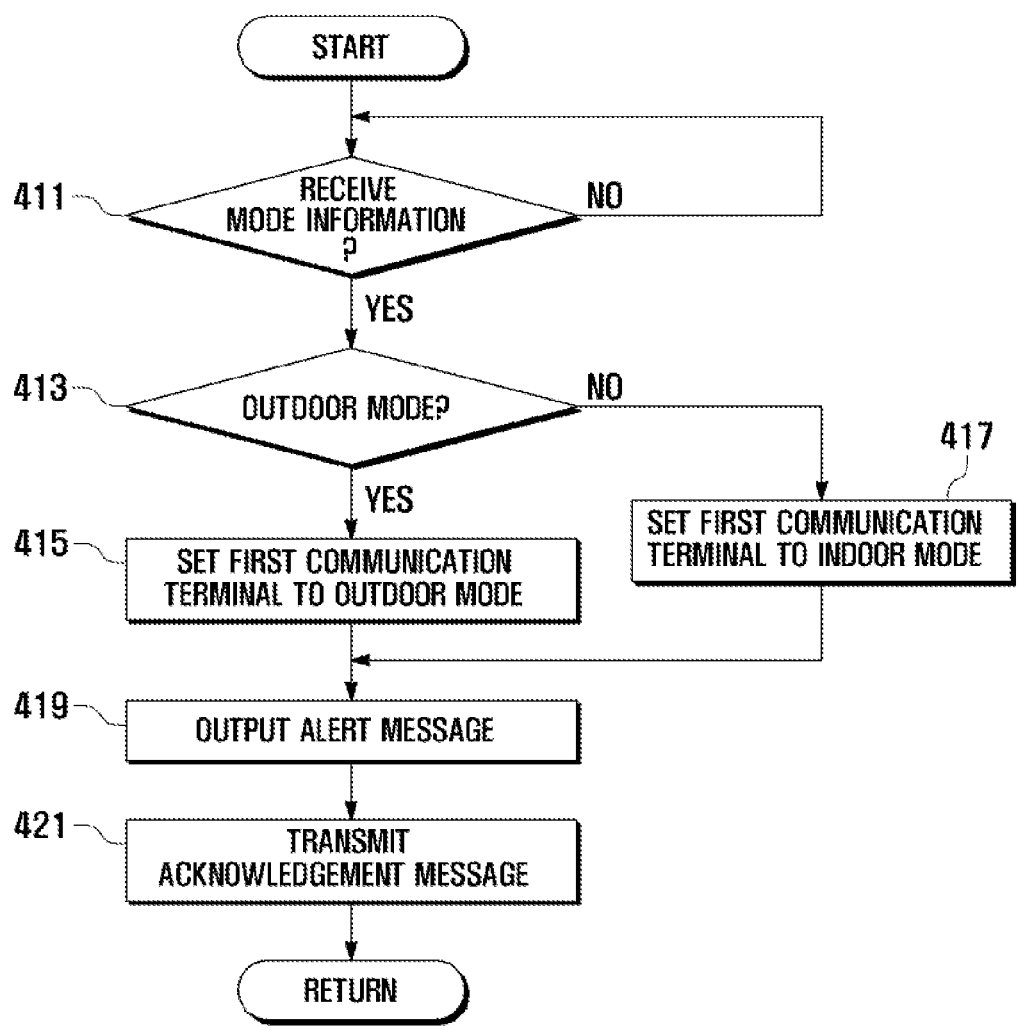
FIG. 4 is a flowchart illustrating a passage mode reset process according to an exemplary embodiment of the present invention.

FIG. 4 is a flowchart illustrating a passage mode reset process according to an exemplary embodiment of the present invention.

Referring to FIG. 4, if the first communication terminal 110 receives the mode information, the mobile control unit 131 of the first communication terminal 110 detects the mode information in step 411 and determines the passage mode indicated by the mode information in step 413. If the passage mode is the outdoor mode, the mobile control unit 131 of the first communication terminal 110 resets its passage mode to the outdoor mode in step 415. Otherwise, the mobile control unit 131 resets its passage mode to the indoor mode in step 417.

After resetting the passage mode, the mobile control unit 131 outputs an alert message in step 419. The alert message may be output through at least one of the mobile audio processing unit 133 and the mobile display unit 135. The mobile control unit 131 may control to output different alert messages according to the passage mode. In addition, the mobile control unit 131 may output different announcement messages according to whether the mode information contains a "no-indoor terminal indicator" indicating that no first communication terminal set to the indoor mode exists.

Next, the mobile control unit 131 transmits acknowledgement data in step 421 after which the passage mode reset process ends. Here, different acknowledgement data may be transmitted according to the reset passage mode. In addition, the mobile control unit 131 may control to transmit different acknowledgement data according to whether the mode information contains data indicating that there are no more first communication terminals set to the indoor mode. The acknowledgement data may be transmitted in the form of a short message, a multimedia message, or an email. The alert messages and acknowledgement data may be stored for respective passage modes within the mobile memory unit 129 in the form of Table 2.

TABLE 2

| Passage Mode | Alert message | Acknowledgement message | Identity information |
| --- | --- | --- | --- |
| Indoor mode | ⊚ Alert tune 2 | "indoor state" | 012-345-6789 |
| Normal outdoor mode | Alert tune 1 | "outdoor state" | 012-543-9876 abc@def.com |
| Final outdoor mode | Voice alert | "final leave" | |
| — | — | — | — |
| — | — | — | — |

For example, when the passage mode of the first communication terminal 110 is set to the indoor mode, the mobile control unit 131 outputs an "alert tune 2". With the alert tune 2, the owner is aware of the first communication terminal 110. At this time, the mobile control unit 131 transmits its identity information with the state message "indoor state" to the second communication terminal 150. That is, the mobile control unit 131 informs the second communication terminal 150 that the first communication terminal 110 locates inside the site.

Also, when the mode information contains the passage mode indicator set to the "outdoor mode" but does not contain "no-indoor terminal indicator," the mobile control unit 131 outputs the "alert tune 1". With the alert tune 1, the owner is aware of the first communication terminal 110. At this time, the mobile control unit 131 transmits its identity information with the state message "outdoor state" to the second communication terminal 150. That is, the mobile control unit 131 informs the second communication terminal 150 that the first communication terminal 110 is located outside the site.

When the mode information contains the passage mode indicator set to the "outdoor mode" and the no-indoor terminal indicator, the mobile control unit 131 outputs a voice alert, e.g. "remember the car keys" or "check the gas valve and water tap." With this voice alert, the owner is made aware of the first communication terminal 100 and made aware of certain checking points as the last person leaving the site. At this time, the mobile control unit 131 transmits its identity information with the state message "final leave." That is, the mobile control unit 131 informs the second communication terminal 150 that the first communication terminal 110 is located outside the site and that no first communication terminal is located inside the site.

Returning to FIG. 2, after resetting the passage mode at step 240, the first communication terminal 110 updates its passage mode in step 250. Here, the first communication terminal 110 resets the passage mode to a preset mode. The passage mode may be reset based on its current location.

Figure 5:
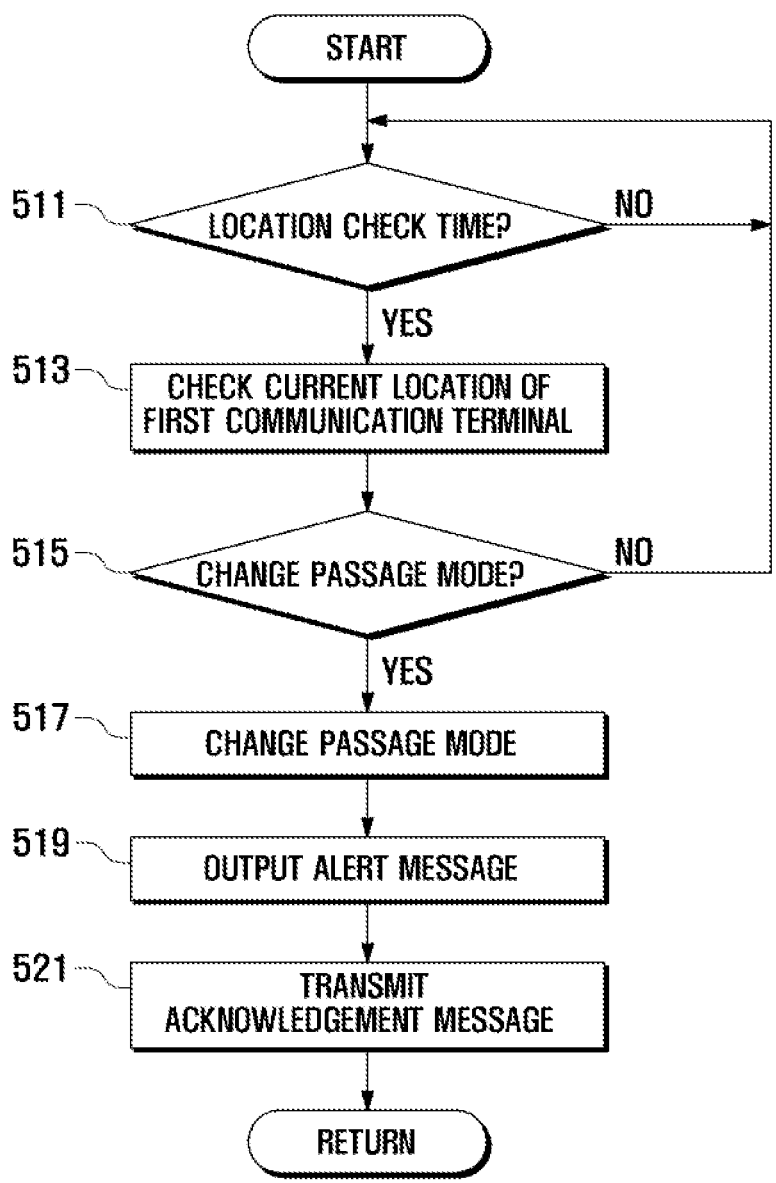
FIG. 5 is a flowchart illustrating a passage mode update process according to an exemplary embodiment of the present invention.

FIG. 5 is a flowchart illustrating a passage mode update process according to an exemplary embodiment of the present invention.

Referring to FIG. 5, the mobile control unit 131 determines whether the current time is the location check time in step 511. If the current time is the location check time, the mobile control unit 131 determines the current location of the first communication terminal 110 in step 513 and determines whether to change the passage mode based on the current location in step 515. That is, the mobile control unit 131 determines whether the current location of the first communication terminal 110 is inside the site. If it is determined to change the passage mode, the mobile control unit 131 changes the passage mode in step 517. That is, if the current passage mode is set to the outdoor mode but the first communication terminal 110 is inside the site, the mobile control unit 131 changes the current passage mode to the indoor mode in step 517. In contrast, if the current passage mode is set to the indoor mode but the first communication terminal 110 is outside the site, the mobile control unit 131 changes the current passage mode to the outdoor mode.

After changing the passage mode, the mobile control unit 131 outputs an alert message corresponding to the changed passage mode in step 519. The alert message may be output through at least one of the mobile audio processing unit 133 and the mobile display unit 135. The mobile control unit 131 may control such that different alert messages are output depending on the changed passage mode. In addition, the mobile control unit 131 may control such that different alert messages are output according to whether the mode information contains the no-indoor terminal indicator.

Next, the mobile control unit 131 transmits acknowledgement data corresponding to the current passage mode to the fixed communication terminal 150 in step 521. The acknowledgement message may be transmitted in the form of a short text message, a multimedia message, an email and the like.

Although it is depicted that the first communication terminal outputs the alert message in the above exemplary embodiment, the present invention is not limited thereto. For example, the second communication terminal may be configured to output the alert message.

Figure 6:
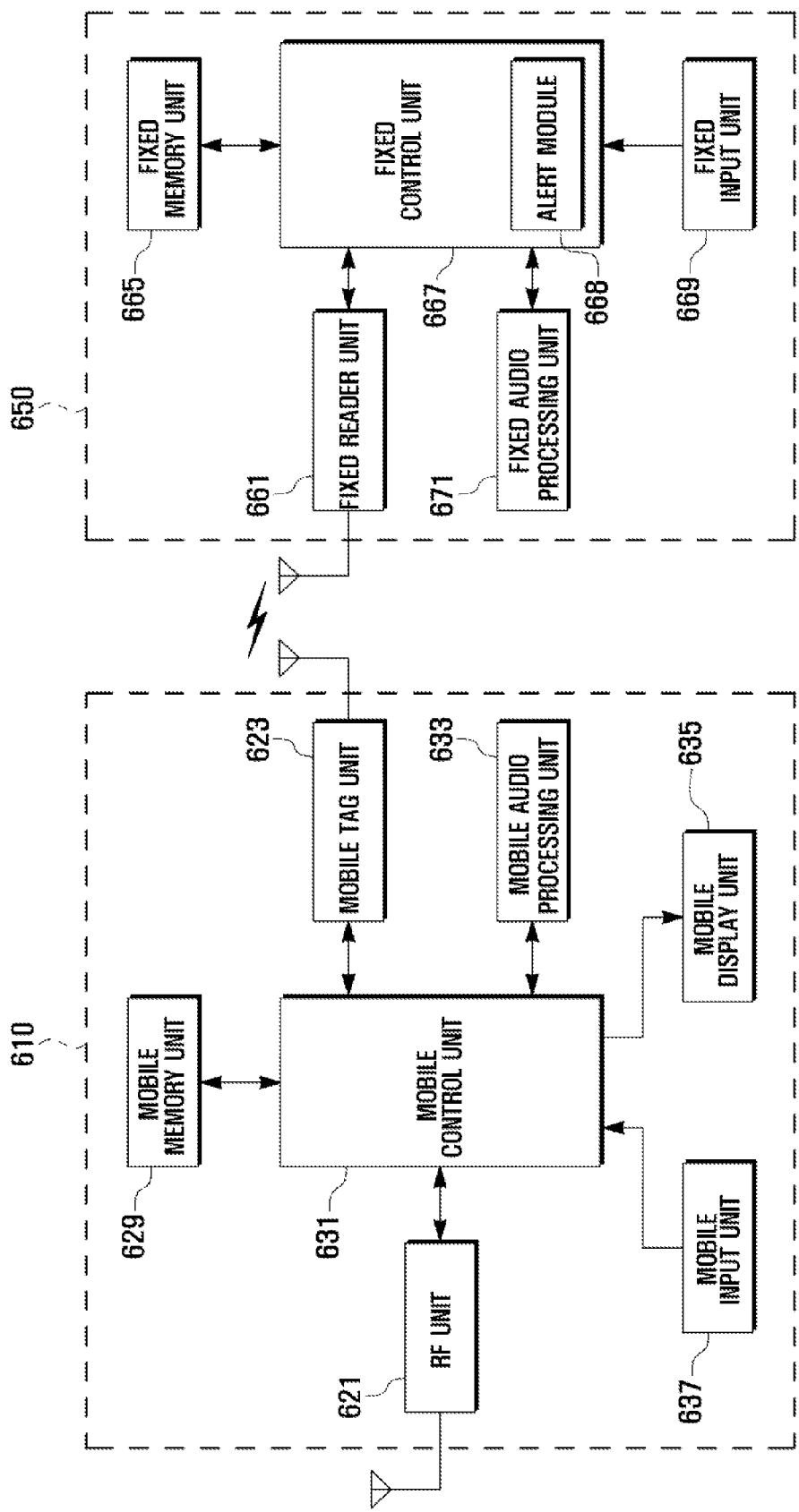
FIG. 6 is a block diagram illustrating a passage alert system according to an exemplary embodiment of the present invention.

FIG. 6 is a block diagram illustrating a passage alert system according to an exemplary embodiment of the present invention. In the illustrated example, it is assumed that the first communication terminal is a mobile terminal and the second communication terminal is a fixed terminal.

The first communication terminal 610 includes an RF unit 621, a mobile tag unit 623, a mobile memory unit 629, a mobile control unit 631, a mobile audio processing unit 633, a mobile display unit 635, and a mobile input unit 637. The second communication terminal 650 includes a fixed reader unit 661, a fixed memory unit 665, a fixed control unit 667, and a fixed input unit 669. Since the structures of the internal elements of the first and second communication terminals 610 and 650 are similar to those of the above described exemplary embodiment, detailed descriptions are omitted.

The fixed memory unit 665 stores the alert messages, and the fixed control unit 667 determines the passage mode of the first communication unit 610 based on the tag information. The fixed control unit 667 includes an alert module 668 for outputting the alert message and controls the alert module 668 to output a different alert message depending on the passage mode.

In this example, the second communication terminal 650 further includes a fixed audio processing unit 671. The fixed audio processing unit 671 receives the inbound audio signal output by the audio codec of the data processing unit (not shown) of the fixed control unit 667 and outputs the audio signal in the form of an audio sound wave through a speaker (SPK) and delivers the outbound audio signal input through a microphone (MIC) to the audio codec of the data processing unit. The fixed audio processing unit 671 outputs the alert message under the control of the alert module 668.

Figure 7:
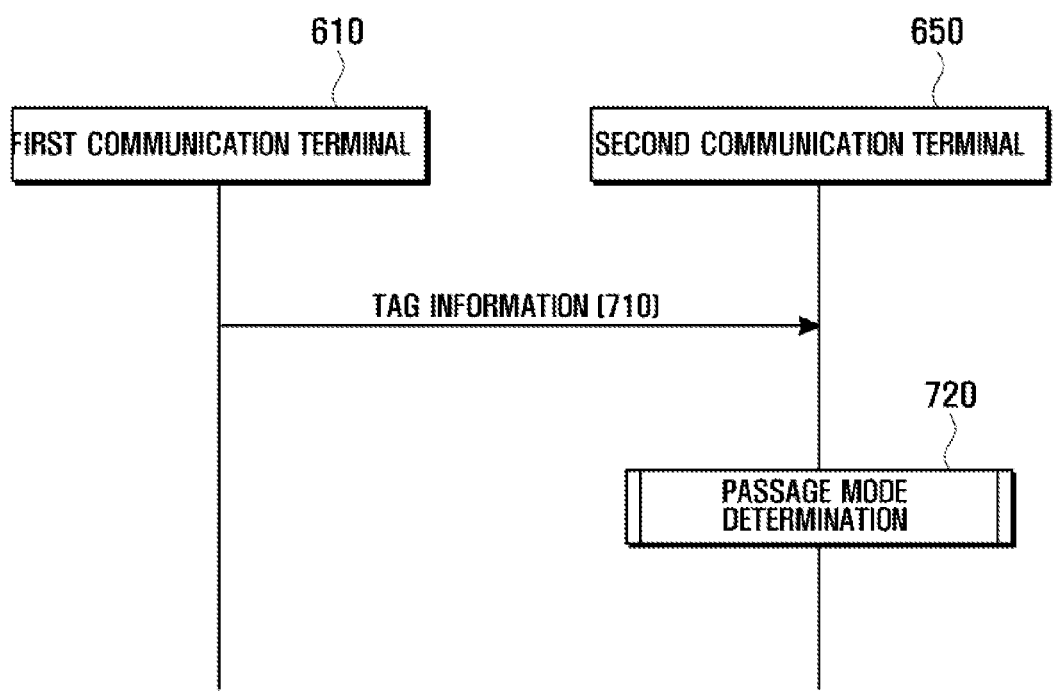
FIG. 7 is a signaling diagram illustrating a passage alert method according to an exemplary embodiment of the present invention.

FIG. 7 is a signaling diagram illustrating a passage alert method according to an exemplary embodiment of the present invention.

Referring to FIG. 7, the first communication terminal 610 transmits its tag information to the second communication terminal 650 in step 710. Upon receipt of the tag information, the second communication terminal 650 determines the passage mode of the first communication terminal 610 based on the tag information in step 720. Once the passage mode of the first communication terminal 650 is determined, the second communication terminal 650 outputs an alert message corresponding to the determined passage mode.

In more detail, the fixed control unit 667 extracts the identity code from the tag information and determines whether the first communication terminal 610 identified with reference to the identity code is registered with the indoor mode value. If the identified first communication terminal 610 has been registered with the indoor mode value, the fixed control unit 667 changes the passage mode of the first communication terminal 610 to the outdoor mode. In contrast, if the first communication terminal 610 has been registered with the outdoor mode value, the fixed control unit 667 changes the passage mode of the first communication terminal 610 to the indoor mode. After changing the passage mode, the fixed control unit 667 controls such that an alert message corresponding to the changed passage mode is output. An example of alert messages corresponding to different passage modes and stored in the form of a lookup table within the fixed memory unit 665 are shown in Table 3.

TABLE 3

| Identity Code | User | Passage Mode | | Alert Message |
|---|---|---|---|---|
| 0x000010 | Tony | Indoor mode | ◎ | Alert tune 2 |
| | | Normal outdoor mode | | Alert tune 1 |
| | | Final outdoor mode | | Voice alert 1 |
| 0x000011 | Allen | Indoor mode | | Alert tune 2 |
| | | Normal outdoor mode | ◎ | Alert tune 1 |
| | | Final outdoor mode | | Voice alert 2 |
| 0x000012 | Sam | Indoor mode | | Alert tune 3 |
| | | Normal outdoor mode | | Alert tune 1 |
| | | Final outdoor mode | ◎ | Voice alert 3 |
| 0x000013 | Jane | Indoor mode | ◎ | Alert tune 1 |
| | | Normal outdoor mode | | Alert tune 2 |
| | | Final outdoor mode | | Alert tune 3 |
| — | — | — | | — — |
| — | — | — | | — — |

For example, the tag information received from the first communication terminal 610 contains the identity code "0x000011," the fixed control unit 667 identifies the Allen's communication terminal (the first communication terminal 610) with the identity code and determines the passage mode of first communication terminal 610 registered with the lookup table. If the registered passage mode is the outdoor mode, the fixed control unit 667 changes the passage mode to the indoor mode and controls the alert module 668 to output the alert tune 2. With the alert tune 2, Allen is made aware of the first communication terminal 610. In contrast, if the first communication terminal 610 is registered with the indoor mode, the fixed control unit 667 changes the passage mode to the outdoor mode and determines whether at least one first communication terminal registered with the indoor mode exists in the lookup table. If there is at least one first communication terminal registered with the indoor mode, the fixed control unit 667 controls the alert module 668 to output the alert tune 1. With the alert tune 2, Allen is aware of the first communication terminal 610. In contrast, if there is no first communication terminal registered with the indoor mode, the fixed control unit 667 controls the alert module 660 to output the voice alert 2, e.g. "remember the car keys" or 'check the gas valve and water tap." With the voice alert 2, Allen is made aware of the first communication terminal 610 and made aware of certain checking points as the last person leaving the site.

Although it is described that the second communication terminal 650 receives the tag information and determines the passage mode of the first communication terminal 610 using the transmitted tag information in this example, the present invention is not limited thereto. For example, the present invention may be implemented in such a manner that the first communication terminal determines its passage mode when it receives the tag information from the second communication terminal.

Figure 8:
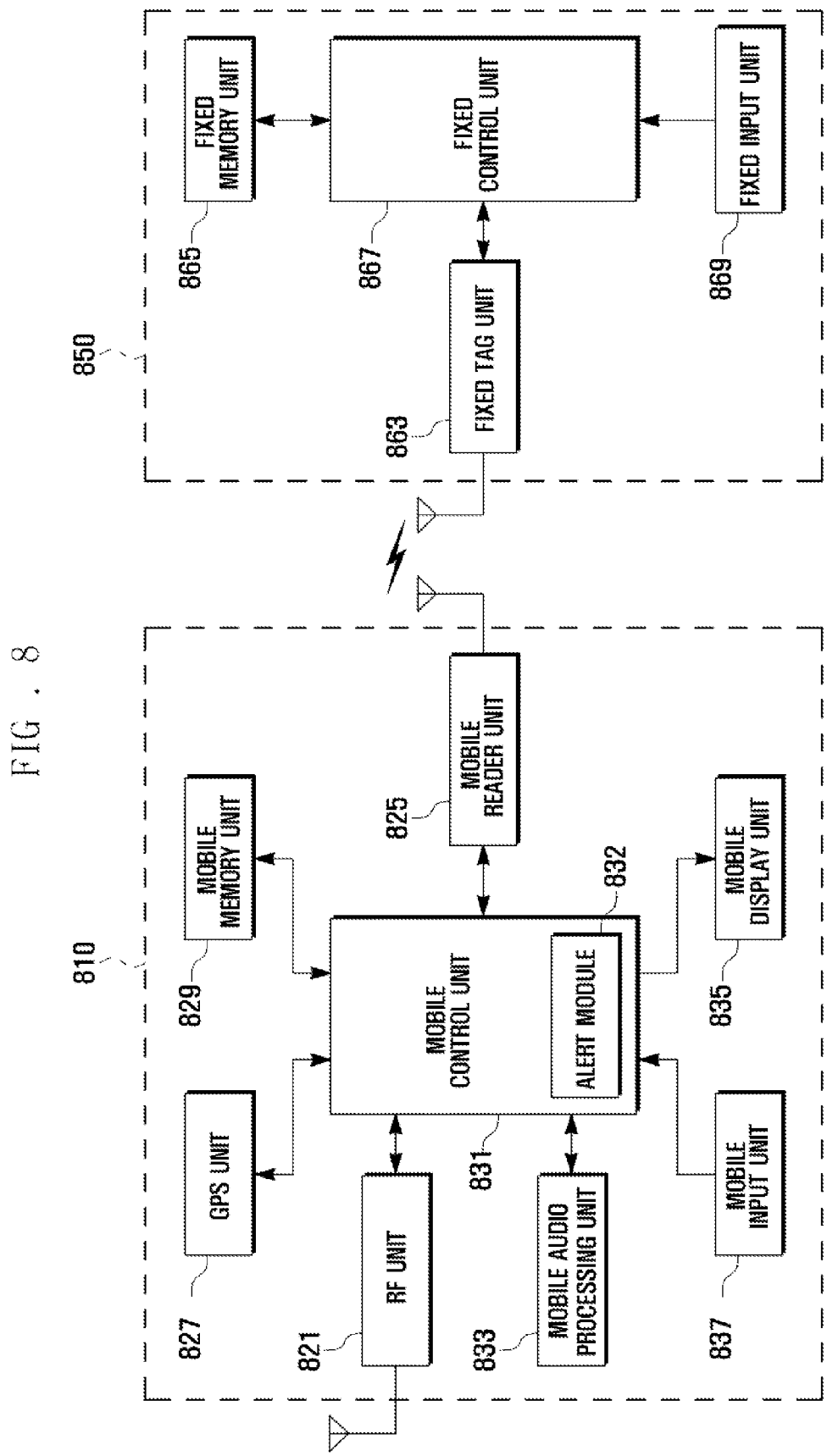
FIG. 8 is a block diagram illustrating a passage alert system according to an exemplary embodiment of the present invention.

FIG. 8 is a block diagram illustrating a passage alert system according to an exemplary embodiment of the present invention. In the illustrated example, it is assumed that the first communication terminal is a mobile terminal and the second communication terminal is a fixed terminal.

Referring to FIG. 8, the passage alert system includes a first communication terminal 810 and a second communication terminal 850. The first and second communication terminals 810 and 850 communicate with each other using a radio frequency identification technology.

The first communication terminal 810 includes an RF unit 821, a mobile reader unit 825, a GPS unit 827, a mobile memory unit 829, a mobile control unit 831, a mobile audio processing unit 833, a mobile display unit 835, and a mobile input unit 837. The mobile control unit 831 includes an alert module 832. The second communication terminal 850 includes a fixed tag unit 863, a fixed memory unit 865, a fixed control unit 867, and a fixed input unit 869. Since the structures of the internal elements of the first and second communication terminals 810 and 850 are similar to those of the above described embodiments, detailed descriptions are omitted.

The mobile reader unit 825 of the first communication terminal 810 receives tag information that is within its range and reads the tag information. The mobile reader unit 825 may be configured to request the tag information periodically. When the tag information is received, the mobile control unit 831 updates the passage mode based on the received tag information. The fixed tag unit 863 transmits the tag information of the second communication terminal 850. The fixed tag unit 863 may previously store the tag information. The fixed tag unit 863 may be configured to radiate the tag information periodically. The fixed tag unit 863 also may be configured to radiate in response to the tag information request.

Figure 9:
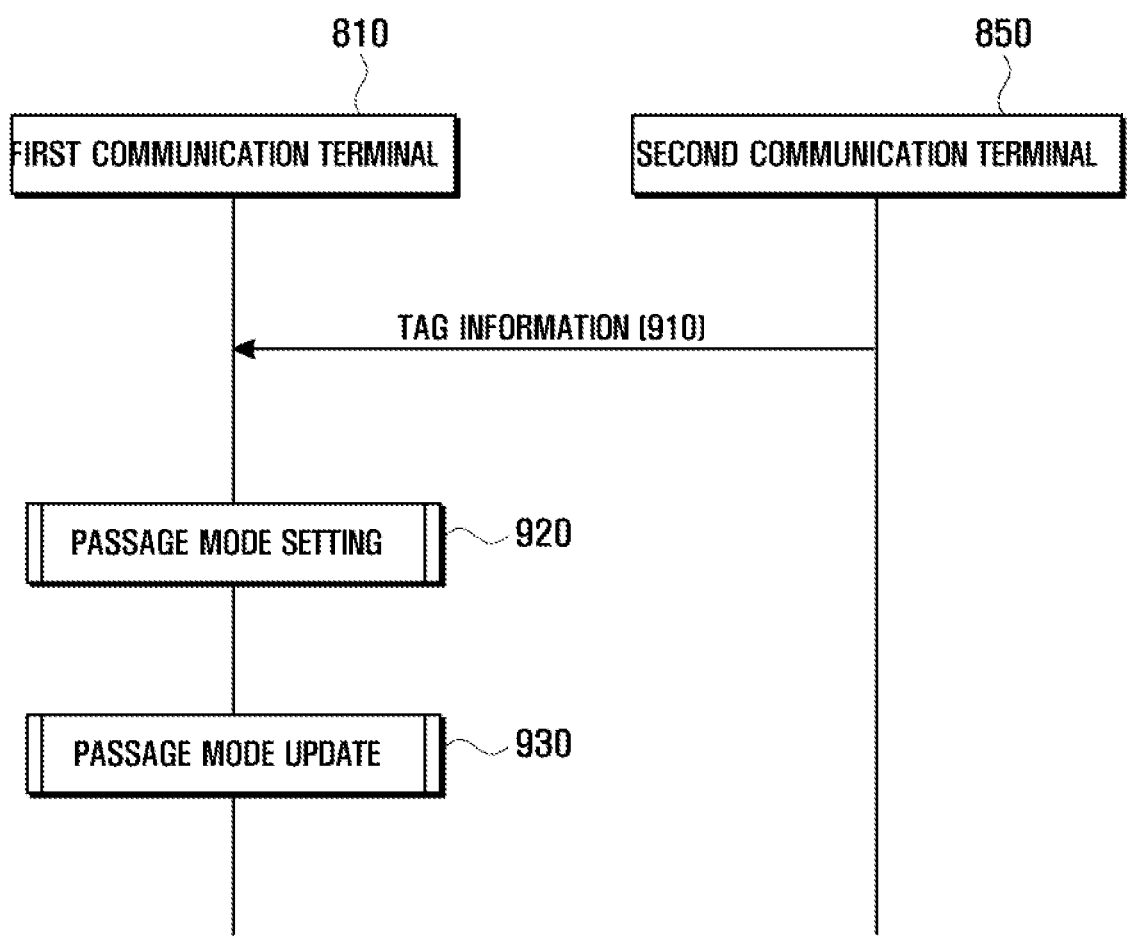
FIG. 9 is a signaling diagram illustrating a passage alert method according to an exemplary embodiment of the present invention.

FIG. 9 is a signaling diagram illustrating a passage alert method according to an exemplary embodiment of the present invention.

Referring to FIG. 9, the second communication terminal 850 transmits its tag information to the first communication terminal 810 in step 910. Upon receipt of the tag information, the first communication terminal 810 determines its passage mode in response to the receipt of the tag information in step 920. At this time, the first communication terminal 810 determines the passage mode based on the tag information. That is, upon receipt of the tag information, the mobile control unit 831 determines the passage mode of the first communication terminal 810. If the passage mode is set to the indoor mode, the mobile control unit 831 changes the passage mode to the outdoor mode. In contrast, if the passage mode is set to the outdoor mode, the mobile control unit 831 changes the passage mode to the indoor mode. At this time, the mobile control unit 831 may control the alert module 832 to output an alert message corresponding to the changed passage mode. Simultaneously, the mobile control unit 831 may control such that an acknowledgement message is transmitted. The alert messages corresponding to different passage modes may be stored in the form of a lookup table within the mobile memory unit 829 as shown in Table 4.

TABLE 4

| Passage Mode | Alert message | Acknowledgement message | Identity information |
|---|---|---|---|
| Indoor mode | ◎ Alert tune 2 | "indoor state" | 012-345-6789 |
| Normal outdoor mode | Alert tune 1 | "outdoor state" | 012-543-9876 abc@def.com |
| Final outdoor mode | Voice alert | "final leave" | |
| — | — | — | — |
| — | — | — | — |

After determining the passage mode, the first communication terminal 810 updates its passage mode in step 930. Also, the passage mode may be updated with reference to the current location of the first communication terminal 810.

In an exemplary embodiment, when the first communication terminal passes the entrance at which the second communication terminal is installed, one of the first and second communication terminals resets the passage mode of the first communication terminal with an output of an alert message corresponding to the changed passage mode such that the owner is aware of the first communication terminal, thereby reducing the possibility of its loss.

As described above, the Radio Frequency IDentification (RFID)-based passage alert method of the present invention enables either a mobile terminal or a fixed terminal installed at a doorway, gate and the like to output an alert when the mobile terminal passes, whereby the owner is aware of the mobile terminal.

While the invention has been shown and described with reference to certain exemplary embodiments thereof, it will be understood by those skilled in the art that various changes in form and details may be made therein without departing from the spirit and scope of the present invention, as defined by the appended claims and their equivalents.

What is claimed is:

1. A passage alert method for a radio frequency identification system including a mobile terminal carried by a user and a second communication terminal fixed at a site, the method comprising:
   determining, at the second communication terminal, a new passage mode of the mobile terminal in response to tag information transmitted by the mobile terminal;
   transmitting mode information indicating the new passage mode to the mobile terminal; and
   updating, at the mobile terminal, an old passage mode with the new passage mode,
   wherein the passage mode comprises one of an indoor mode, indicating that the mobile terminal is inside the site, and an outdoor mode, indicating that the mobile terminal is outside the site, and
   wherein the determining of the new passage mode comprises changing the old passage mode to the new passage mode.

2. The method of claim 1, further comprising:
   determining a location of the mobile terminal periodically; and
   updating the old passage mode of the mobile terminal depending on the location.

* * * * *